United States Patent
Wennemers et al.

(10) Patent No.: US 12,323,485 B1
(45) Date of Patent: Jun. 3, 2025

(54) CROSS-APPLICATION PROTOCOL DESCRIBING INTEGRATION DEPENDENCIES

(71) Applicant: SAP SE, Walldorf (DE)

(72) Inventors: Sebastian Wennemers, Mannheim (DE); Simon Heimler, Coswig (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/511,363

(22) Filed: Nov. 16, 2023

(51) Int. Cl.
  *H04L 67/1095* (2022.01)
(52) U.S. Cl.
  CPC ............................. *H04L 67/1095* (2013.01)
(58) Field of Classification Search
  None
  See application file for complete search history.

(56) References Cited

U.S. PATENT DOCUMENTS

| | | | | |
|---|---|---|---|---|
| 7,966,233 | B1* | 6/2011 | Khowash | G06Q 30/0601 |
| | | | | 705/40 |
| 10,915,378 | B1 | 2/2021 | Mary et al. | |
| 2009/0024561 | A1* | 1/2009 | Palanisamy | G06F 16/178 |
| 2017/0118098 | A1* | 4/2017 | Littlejohn | H04L 41/145 |
| 2019/0332374 | A1* | 10/2019 | Harner | G06F 8/34 |
| 2020/0201609 | A1 | 6/2020 | Schaus et al. | |
| 2022/0021575 | A1* | 1/2022 | Wang | H04L 41/0859 |
| 2022/0237212 | A1 | 7/2022 | Dixit et al. | |
| 2022/0405296 | A1 | 12/2022 | Buchmann et al. | |
| 2023/0090977 | A1* | 3/2023 | Houston | H04L 67/1097 |
| | | | | 709/248 |
| 2023/0176877 | A1 | 6/2023 | Heimler | |
| 2023/0176931 | A1 | 6/2023 | Heimler et al. | |

OTHER PUBLICATIONS

U.S. Appl. No. 18/511,338, Heimler et al., Open Resource Discovery of Entity Types, filed Nov. 16, 2023, 44 pages.

* cited by examiner

*Primary Examiner* — Mohamed Ibrahim
(74) *Attorney, Agent, or Firm* — Fish & Richardson P.C.

(57) ABSTRACT

The disclosure generally describes methods, software, and systems for cross-application protocols describing integration dependencies. A request is received to synchronize customer data from multiple system instances. The system instances include one or more application programming interfaces. A semantic description of an integration process configured to synchronize the customer data from the plurality of system instances is generated. The semantic description defines integration dependencies between system instances. The integration process is executed to synchronize the customer data from the plurality of system instances to generate synchronized customer data. The synchronized customer data are provided for storage.

20 Claims, 7 Drawing Sheets

CROSS-APPLICATION PROTOCOL DESCRIBING INTEGRATION DEPENDENCIES

TECHNICAL FIELD

The present disclosure relates to computer-implemented methods, software, and systems for providing cross-application protocols describing integration dependencies.

BACKGROUND

Application programming interfaces (APIs) provide interfaces that can be used in computer applications to gain access to other systems. The interfaces can be implemented, for example, as method calls, procedure calls, or function calls. An application can include a set of APIs that serve as a collection of building blocks to access various resources. For an application to function correctly, in the setup or configuration phase, integration of APIs is defined and configured. Gathering information used for API integration is cumbersome because APIs may follow many different types of communication protocols, each defining a set of input and output parameters for the API.

SUMMARY

Implementations of the present disclosure are directed to techniques and tools for discovering, representing, and exposing various types of application programming interfaces (APIs) integration dependencies for bundling those dependencies to multiple external APIs to one integration scenario. More particularly, implementations of the present disclosure are directed to an integration process configured to synchronize customer data from multiple system instances.

In some implementations, a method includes: receiving, by one or more processors, a request to synchronize customer data from a plurality of system instances, one or more of the plurality of system instances including one or more application programming interfaces (API), generating, by the one or more processors, a semantic description of an integration process configured to synchronize the customer data from the plurality of system instances, the semantic description defining integration dependencies between the plurality of system instances, executing, by the one or more processors, the integration process to synchronize the customer data from the plurality of system instances to generate synchronized customer data, and providing, by the one or more processors, the synchronized customer data.

The foregoing and other implementations can each optionally include one or more of the following features, alone or in combination. In particular, implementations can include all the following features:

In a first aspect, combinable with any of the previous aspects, wherein executing, by the one or more processors, the integration process includes execution of the APIs and events according to integration dependencies between the plurality of system instances. In another aspect, combinable with any of the previous aspects, the semantic description includes references to one or more system instances described as integration targets. In another aspect, combinable with any of the previous aspects, one or more of the plurality of system instances includes dependencies expressing semantically different data inputs. In another aspect, combinable with any of the previous aspects, the computer-implemented method further includes filtering, by the one or more processors, a system landscape for suitable integration targets based on integration requirements. In another aspect, combinable with any of the previous aspects, the computer-implemented method further includes identifying, by the one or more processors, from the suitable integration targets, one or more system instances compliant with the integration process. In another aspect, combinable with any of the previous aspects, the suitable integration targets include external files. In another aspect, combinable with any of the previous aspects, the synchronized customer data includes code defining calls to user-selected API and event information, wherein the code is in a format of an API provider.

Other implementations of the aspect include corresponding systems, apparatus, and computer programs, configured to perform the actions of the methods, encoded on computer storage devices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the subject matter of the specification are set forth in the accompanying drawings and the description below. Other features, aspects, and advantages of the subject matter will become apparent from the description, the drawings, and the claims.

DETAILED DESCRIPTION

Figure 1:
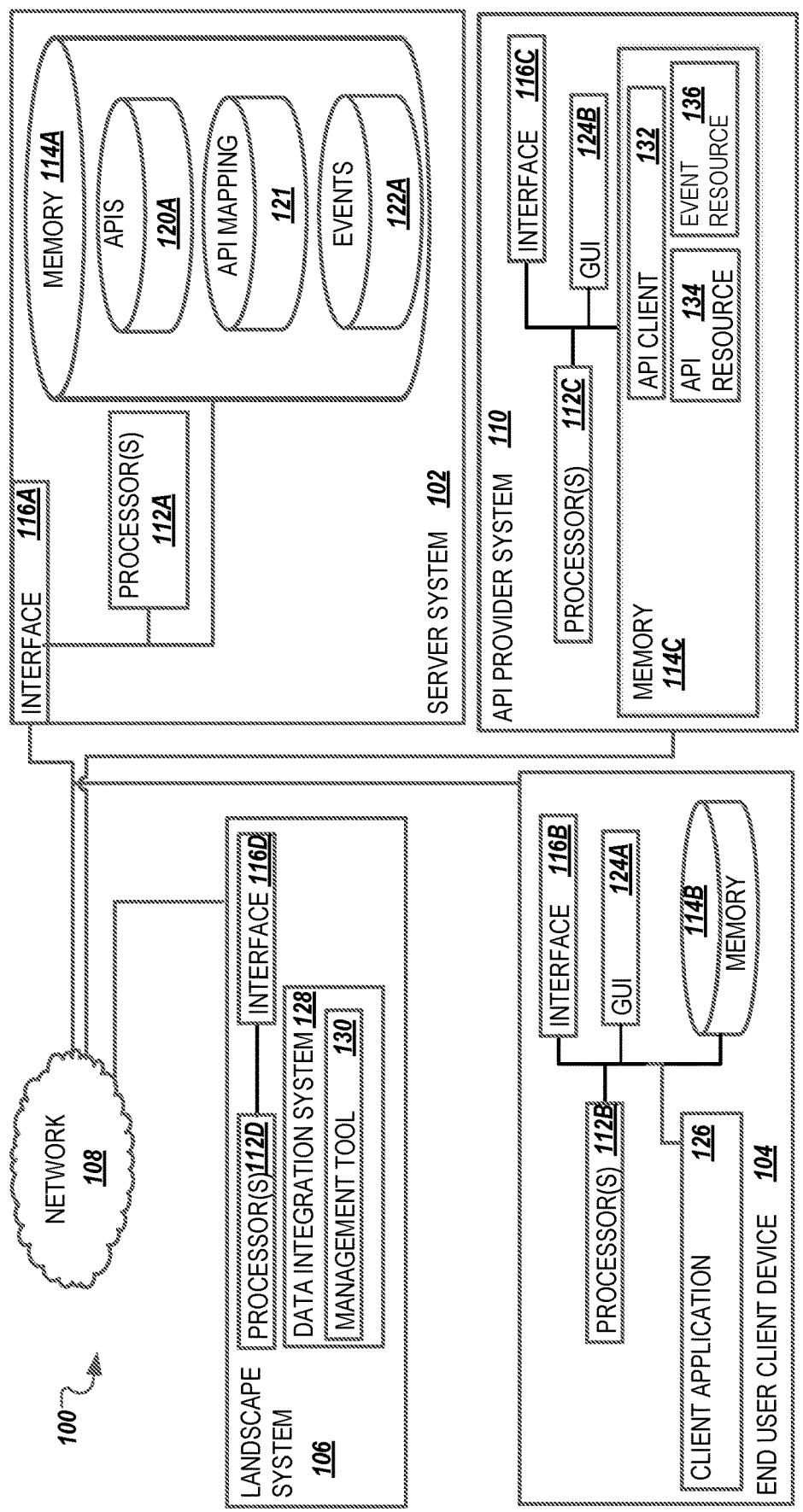
FIG. 1 is a block diagram of an example system that can be used to execute implementations of the present disclosure.

Implementations of the present disclosure are directed to techniques and tools for cross-application protocols describing integration dependencies. More particularly, implementations of the present disclosure are directed to discovering, representing, and exposing various types of application programming interfaces (APIs) integration dependencies for bundling resources across different protocols. APIs can include, for example, programming interfaces (including events) that serve as the building blocks to support extensions and integrations from a computer application in a third-party system or language. However, each source system that provides APIs may have different ways to expose the metadata associated with APIs and events.

The metadata can define, for example, a library of available APIs and information about what each API does, how the API is called (and used), and what the expected results include without traditionally providing a description of dependencies on external resources. The traditional systems are limited not only in providing a description of what a system offers, but also in providing a description of what a system can consume. Such descriptions are generally implemented as integration client code, usually provided in association with an external or assumed target API contract. For example, conventional systems can include a viable mechanism to describe software components and/or embedded dependencies at an application internal development level but are missing an equivalent technology stack-agnostic standard configured to describe dependencies across applications via well-defined contract information about APIs. Without knowing which APIs and events are available from (or exposed by) a system, it can be difficult for software engineers, for example, to build extensions or integrations that use the APIs. Existing conventional approaches regarding publishing API metadata can rely on, for example, a) documentation b) custom API catalogs (for example, SAP's Gateway Catalog Service), and c) hypermedia APIs such as OData. Moreover, conventional approaches may not scale easily or may make it difficult to build extensions and integrations in a heterogeneous landscape. Additionally, some tools (such as web integrated development environment (WebIDE), Mobile Software Development Kit (SDK), Cloud Platform Integration, API Management, and Enterprise Messaging, do not have standard ways to discover APIs and events.

Addressing the limitations of traditional protocol specific metadata standards, the integration protocol described in the present disclosure enables bundling of required resources across different protocols. The integration protocol described in the present disclosure generates descriptions including a semantic meaning, which defines the overall goal of the integration. For example, descriptions can define dependencies of an application that might not only depend on an asynchronous API event subscription, but also on accessing an API for data sharing, as well as an API for development frameworks. The integration capabilities enable definition of core (mandatory) dependencies and secondary (optional) dependencies, to express some APIs and events (capabilities) that can be alternatives to each other, to realize the same integration outcome. For example, an application can be configured to work with either an event-based integration or, if not available, a synchronous representational state transfer (REST) API based integration.

The integration protocol described herein provides a technology stack-agnostic standard configured to describe dependencies across applications via well-defined contract information about APIs that can be provided online, for example, as API libraries or catalogs. The integration dependencies can be defined, for example, by collecting information about disparate APIs into a central location that presents the information in a standard format to API consumers and by identifying compatible target resources based on requirements.

In some implementations, discovery of APIs and related connection information can be performed automatically by machine-driven processes. For example, automated processes can crawl the Internet to obtain information about APIs, the interfaces, and connection information. Information that is obtained can become part of an API catalog that provides information regarding APIs in a standardized way, making the information machine-readable and presentable to users. In some implementations, API providers can provide or publish information about their APIs for inclusion in the API catalog. Machine-readable formats can include, for example, JAVASCRIPT Object Notation (JSON). In some implementations, the API catalog can be as available through a centralized portal. The centralized portal can allow users to connect to different APIs that can have various (including proprietary) communication protocols. In some implementations, the API catalog can provide aggregated information so that users can obtain access to the APIs that may not be exposable in other ways. For example, some APIs may be in languages that some users are not able to understand. In the example, a common language provided by the API catalog.

The integration protocol described in the present disclosure can provide multiple technical advantages, including the following advantages. Integration dependencies can enable bundling of multiple external resources (APIs) across different protocols, creating a semantic meaning, defining the overall goal of the integration. The integration dependencies can indicate multiple scenarios, to which the APIs belong to. The discovery and consumption of APIs can be faster than in convention systems, in which many different protocols are learned. Discovery of dependencies by developer and machines can be supported, optimizing computing system efficiency in integrating APIs. Client libraries and IDE plugins can be built to optimize a software development process. API communities can be more easily accessible and further developed based on defined API integration dependencies. APIs and event definitions can be retrieved with information about the supported authentication and API lifecycle information (e.g., version, latest-version, software version, and deprecation policies). Public APIs can be exposed that do not require authentication to access resources. Taxonomy, interfaces, and services characteristics can be harmonized across various service providers. The harmonization can adhere to the representational state transfer (REST) harmonization guidelines from various groups.

FIG. 1 is a block diagram illustrating an example system 100 for integration of APIs. Specifically, the illustrated example system 100 includes or is communicably coupled with a server system 102, an end-user client device 104, an API provider 110, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively.

In the example of FIG. 1, the server system 102 is intended to represent various forms of servers including, but not limited to a web server, an application server, a proxy server, a network server, and/or a server pool. In general, server systems 102 accept requests for application services and provides such services to any number of end-user client devices 104 (e.g., the client device 104 over the network 108). In accordance with implementations of the present disclosure, and as noted above, the server system 102 can host a solution environment that can be a cloud environment providing software applications, systems, and services that can be consumed by customers as a service. In some instances, the server system 102 can support configuring of various tenants of different types, as well as services of different types that are integrated in customer integration scenarios and support execution of defined processes. For example, the server system 102 includes a processor 112A, a memory 114A and an interface 116A. The memory 114A can include APIs 120A, API mapping 121, and events 122A. The API mapping 121 in the memory 114A can include integration dependency documents defining lists of aspects that point to resources (APIs and events) of API provider system(s) 110. The API mapping 121 provides references to external resources, that can be described by the integration target via open resource discovery (ORD). In some implementations, a dependency defined by API mapping 121 can also point to resources within a same system (e.g., if the resource is to be used by the integration target as an information backchannel and/or if it defines the contract for the integration target.

The end-user client device 104 and the API provider 110 may each be any computing device operable to connect to or communicate in the network(s) 108 using a wireline or wireless connection. In general, each of the end-user client device 104 and the API provider 110 includes an electronic computer device operable to receive, transmit, process, and store any appropriate data associated with the system 100 of FIG. 1. Each of the end-user client device 104 and the API provider 110 is generally intended to encompass any client computing device such as a laptop/notebook computer, wireless data port, smart phone, personal data assistant (PDA), tablet computing device, one or more processors within these devices, or any other suitable processing device. The client device 104 and the API provider 110 respectively include interface(s) 116B, 116C, processor(s) 112B, 112C, memories 114B, 114C, and graphical user interface(s) (GUIs) 124A, 124B. The end-user client device 104 can include one or more client applications 126. The client application 126 can be any type of application that allows a client device to request and view content on the client device (e.g., generate a request for synchronized customer data). In some implementations, a client application 126 can use parameters, metadata, and other API and event dependency information received at launch to access API mapping 121 from the server system 102. In some instances, a client application 126 may be an agent or client-side version of the one or more enterprise applications running on an enterprise server (not shown). The memory 114C of the target API provider system 110 can include an API client 132, API resources 134, and event resources 136 that can be used for integration dependency. For example, the end-user client device 104 and/or the API provider 110 may comprise a computer that includes an input device, such as a keypad, touch screen, or other device that can accept user information, and an output device that conveys information associated with the operation of the server system 102, or the client device itself, including digital data, visual information, or a GUI 124A, 124B, respectively. The GUI 124A, 124B each interface with at least a portion of the system 100 for any suitable purpose, including generating a visual representation of the client application 126 or an administrative application, respectively. In particular, the GUIs 124A, 124B may each be used to view and navigate various Web pages. Generally, the GUIs 124A, 124B each provide the user with an efficient and user-friendly presentation of object data (metadata) provided by or communicated within the system. The GUIs 124A, 124B may each comprise a plurality of customizable frames or views having interactive fields, pull-down lists, and buttons operated by the user. The GUIs 124A, 124B each contemplate any suitable graphical user interface, such as a combination of a generic web browser, intelligent engine, and command line interface (CLI) that processes information and efficiently presents the results to the user visually.

The landscape systems 106 can include multiple systems that exist in a multi-system landscape. An organization can use different systems, of different types, to run the organization, for example. The landscape systems 106 can include systems from a same customer or different customers. The landscape systems 106 can each include at least one of an interface 116D, a processor 112D, and a data integration system 128. The data integration system 128 can include an integration management tool 130 to define integration capabilities. The integration capabilities include definitions of core (mandatory) dependencies and secondary (optional) dependencies, to express some APIs and events (capabilities) that can be alternatives to each other, to realize the integration outcome. The landscape management configuration tool 130 can filter the customer landscape to identify suitable integration targets, from multiple API provider systems 110, based on integration requirements and can automatically select an identified API provider systems 110 for establishing connections to any of the API client 132, API resources 134, and event resources 136 of a target API provider system 110, over the network 108.

In some implementations, the network 108 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems. Data exchanged over the network 108, is transferred using any number of network layer protocols, such as Internet Protocol (IP), Multiprotocol Label Switching (MPLS), Asynchronous Transfer Mode (ATM), Frame Relay, etc. Furthermore, in implementations where the network 108 represents a combination of multiple sub-networks, different network layer protocols are used at each of the underlying sub-networks. In some implementations, the network 108 represents one or more interconnected internetworks, such as the public Internet.

Each processor 112A, 112B, 112C, 112D included in the end-user client device 104 or the API provider 110 may be a central processing unit (CPU), an application specific integrated circuit (ASIC), a field-programmable gate array (FPGA), or another suitable component. Generally, each processor 112A, 112B, 112C, 112D included in the end-user client device 104 or the API provider 110 executes instructions and manipulates data to perform the operations of the end-user client device 104 or the API provider 110, respectively. Specifically, each processor 112A, 112B, 112C, 112D included in the end-user client device 104 or the API provider 110 executes the functionality required to send requests to the server system 102 and to receive and process responses from the server system 102. Each processor 112A, 112B, 112C, 112D may be a central processing unit (CPU), a blade, an application specific integrated circuit (ASIC), a field-programmable gate array (FPGA), or another suitable component. Each processor 112A, 112B, 112C, 112D executes instructions and manipulates data to perform the operations of the respective system (the server system 102, the end-user client device 104, the API provider 110, and the landscape systems 106). Specifically, each processor 112A, 112B, 112C, 112D executes the functionality required to receive and respond to requests from the respective system (the server system 102, the end-user client device 104, the API provider 110, and the landscape systems 106), for example.

Interfaces 116A-116D are used by the server system 102, the end-user client device 104, the landscape system 106, and the API provider 110, respectively, for communicating with other systems in a distributed environment—including within the system 100—connected to the network 108. Generally, the interfaces 116A-116D each comprise logic encoded in software and/or hardware in a suitable combination and operable to communicate with the network 108. More specifically, the interfaces 116A-116D may each comprise software supporting one or more communication protocols associated with communications such that the network 108 or interface's hardware is operable to communicate physical signals within and outside of the illustrated system 100.

The memory 114A, 114B, 114C may include any type of memory or database module and may take the form of volatile and/or non-volatile memory including, without limitation, magnetic media, optical media, random access memory (RAM), read-only memory (ROM), removable media, or any other suitable local or remote memory component. The memory 114A, 114B, 114C may store various objects or data, including caches, classes, frameworks, applications, backup data, objects, jobs, web pages, web page templates, database tables, database queries, repositories storing customer information and/or dynamic information, and any other appropriate information including any parameters, variables, algorithms, instructions, rules, constraints, or references thereto associated with the purposes of the server system 102, the end-user client device 104, the API provider system 110, or the landscape system 106, respectively.

There may be any number of end-user client devices 104 and API provider systems 110 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of the disclosure. Moreover, while client device may be described in terms of being used by a single user, the disclosure contemplates that many users may use one computer, or that one user may use multiple computers. As used in the present disclosure, the term "computer" is intended to encompass any suitable processing device. For example, although FIG. 1 illustrates a single server system 102, a single end-user client device 104, a single API provider 110, the system 100 can be implemented using a single, stand-alone computing device, two or more servers 102, or multiple client devices. The server system 102, the end-user client device 104 and the API provider system 110 may include any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server system 102 and the end-user client device 104 and the API provider system 110 may be adapted to execute any operating system or runtime environment, including Linux, UNIX, Windows, Mac OS®, Java™, Android™, iOS, BSD (Berkeley Software Distribution) or any other suitable operating system. According to one implementation, the server system 102 may also include or be communicably coupled with an e-mail server, a Web server, a caching server, a streaming data server, and/or other suitable server.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include multiple sub-modules, third-party services, components, libraries, and such, as appropriate. Conversely, the features and functionality of various components can be combined into single components as appropriate.

Figure 2:
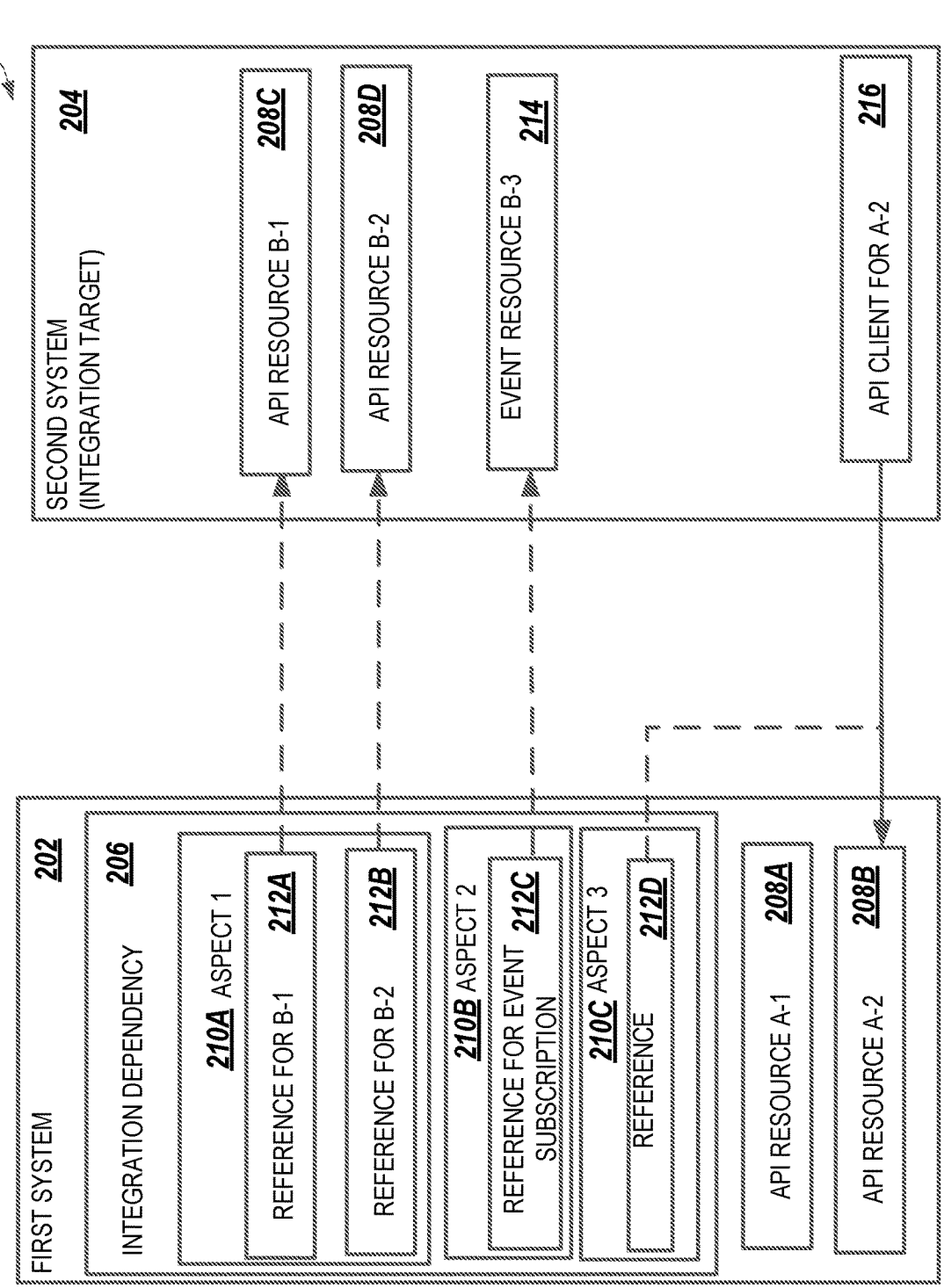
FIG. 2 is a block diagram of an example integration scenario between two systems, according to some implementations of the present disclosure.

FIG. 2 is a block diagram of an example of an integration dependency architecture 200 and aspects in context to multiple entities (API providers) 202, 204. The example integration dependency architecture 200 illustrates how API providers can expose their API resources and dependencies, with each of the APIs having a different language and a different communication protocol. The first system 202 can include an integration dependency module 206 and one or more API resources 208A, 208B. The integration dependency module 206 can include multiple aspects 210A, 210B, 210C. Each aspect 210A, 210B, 210C can include one or more references 212A, 212B, 212C, 212D. The second system 204 can include an integration target system. The second system 204 can include one or more API resources 208C, 208D, one or more event resources 214, and an API client 216.

The first system 202 can expose API resources 208A, 208B on its own side, and also defines the integration dependency using the integration dependency module 206. In the illustrated example, the first system 202 has two requirements, which include references to external resources of the second system 204. The first aspect 210A shows the situation that it can be either realized by getting access to the API resource B-1 208B or by getting access to the API resource B-2 208C. The API client implementation in the first system 202 can handle both API resources 208C, 208D as alternatives. The second aspect 210B covers the event subscription use case. The third aspect 210C points to an own API resource, which implies that the integration target implements an API client to send data back to the first system 202.

A portion of the aspects 210A, 210B, 210C can define mandatory integration dependencies that have an "AND" relationship and some aspects 210A, 210B, 210C may be optional. The aspects 210A, 210B, 210C can be optional if the application can still provide meaningful results without it being provided. Within a particular aspect all listed resources are considered alternatives to each other ("OR" condition). Within one or more of the aspects 210A, 210B, 210C there can be references to semantically equivalent API or event resources that are alternatives to each other (OR condition). The aspects 210A, 210B, 210C can include constraints like a minimum version of the target resource. The aspects 210A, 210B, 210C can define a subset of the target resource that is needed. The aspects 210A, 210B, 210C can optimize the number of subscriptions. The requirement API or event resources 214 can be references to descriptions from another (external) application if the integration target application owns the contract and lifecycle of it. A contract can also be owned by the described application itself, based on descriptions provided by the aspects 210A, 210B, 210C. In some implementations, the aspects 210A, 210B, 210C can describe which consumption bundle is to be used for setting up trust and credentials to the target API or event resource 214. The aspects 210A, 210B, 210C can expose an API or event resource contract that another (external) application needs to implement and fulfill to integrate with the application in focus. The aspects 210A, 210B, 210C can provide a list of external requirements and what integration outcomes/scenarios it realizes by integrating with the requirement targets.

The example integration dependency architecture 200 can be modified to include any number of aspects and references that vary depending on integration dependency scenarios. In one example scenario, a system (e.g., first system 202) can include a reference to an external API resource, described by the integration target system. Within the example scenario, the integration target system owns the contract. The system that describes the integration dependency can initiate the interaction (e.g., using one or more aspects). The aspect 210A, 210B, 210C can reference to an own inbound API resource (or inbound event resource). If referencing to the own inbound API resource, the described system owns the API implementation (and potentially also the API contract). The integration target system can use the API to send information to the described system that is relevant to the integration dependency (e.g., aspect 210C). The requirement can reference an own outbound API or event resource. The contract can be owned by the described system, but the system might not act in a server role. Instead, it can interact with the integration target system according to the defined contract.

Figure 3:
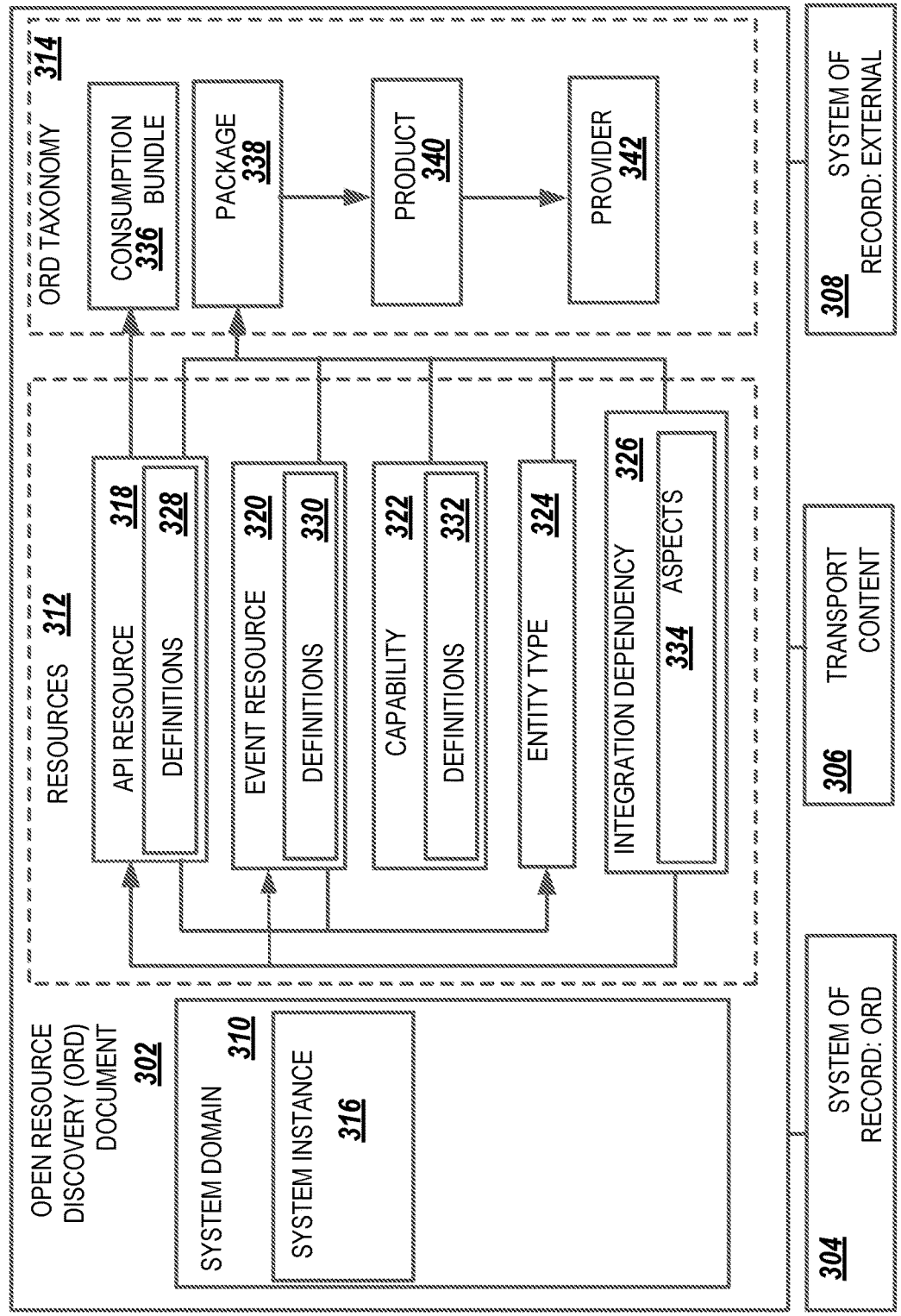
FIG. 3 is a block diagram of example integration dependency and aspects according to some implementations of the present disclosure.

FIG. 3 is a block diagram of an example of a dependency integration architecture 300 using open resource discovery API capabilities. The dependency integration architecture 300 includes an ORD document 302, an ORD system or record 304, a transport content 306, and an external system or record 308. The ORD system can be configured to provide structured metadata know-how for associated APIs using the ORD document 302.

The ORD document 302 includes a system domain 310, resources 312, and ORD taxonomy 314. The system domain 310 includes a system instance 316. The resources 312 include an API resource 318, an event resource 320, a capability 322, an entity type 324, and integration dependency 326. The API resource 318 includes definitions 328. The event resource 320 includes definitions 330. The capability 322 includes definitions 332. The entity type 324 includes a definition of type-level (e.g., integration scenario-level).

The integration dependency 326 includes aspects 334 (e.g., 210A, 210B, 210C described with reference to FIG. 2). The integration dependency 326 can include integration dependencies that can be mandatory, being defined as a prerequisite for provisioning a respective system. The integration dependency 326 can inherit shared ORD attributes that can be used to handle lifecycle, versioning, globally unique IDs, correlations and more aspects 334. The integration dependency 326 can provide the technical information involved in integrating with only one type of target systems for an integration purpose. If multiple systems are scheduled to be integrated, the integration can be described as multiple integration dependencies. Multiple integration dependencies (from multiple systems) can be grouped together in multiple integration modules. The ORD taxonomy 314 includes a consumption bundle 336, a package 338, a product 340, and a provider 342. Overarching information like processes and blueprints can be governed and defined centrally to correctly link individual systems (e.g., via application namespaces, tenant IDs and ORD IDs of Integration Capabilities). For example, an API resource 318 is linked to a consumption bundle. The event resource 320, the capability 322, the entity type 324, and the integration dependency 326 are linked to the package 338 that defines a product 340 and is linked to a respective provider 342.

The dependency integration architecture 300 provides an improvement over the conventional API integrations because of the inclusion of an integration dependency 326 in the resources. The dependency integration architecture 300 provides a robust and well-detailed documentation, including transparency of involved technical artifacts and integration flow including data flow. The dependency integration architecture 300 provides potential for automation or, at least, a decrease of manual steps that can be limited to setting up event subscriptions.

Figure 4:
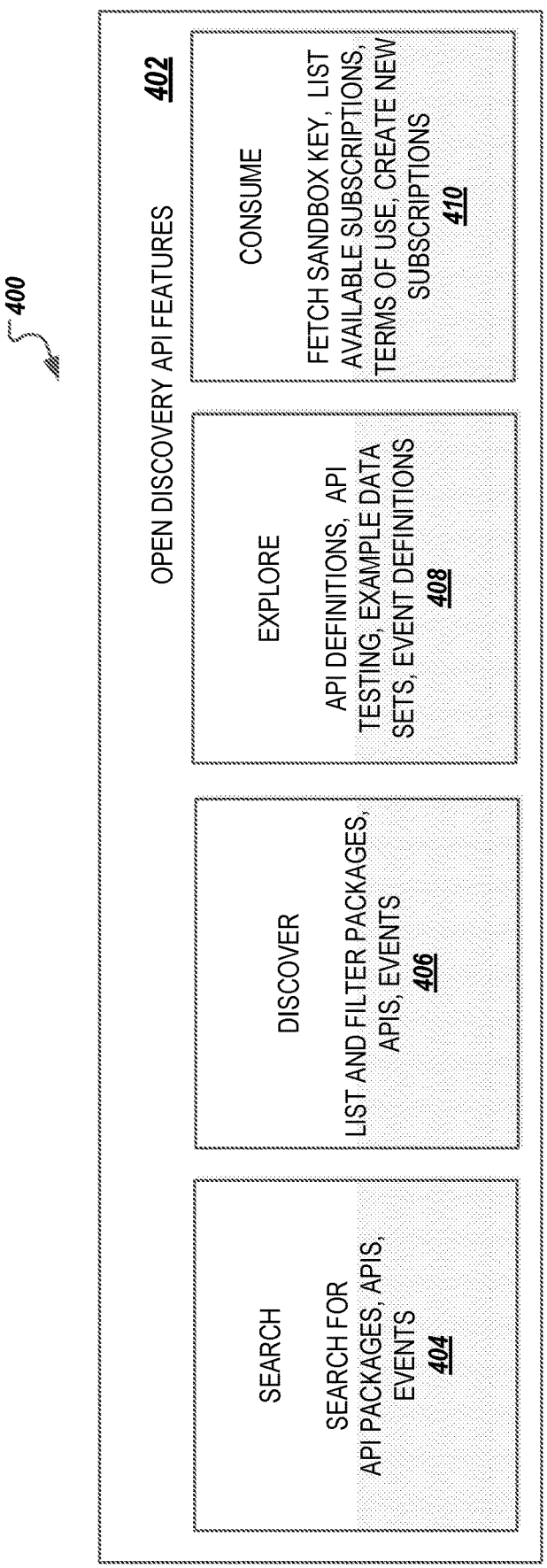
FIG. 4 is a block diagram showing examples of open resource discovery API features.

FIG. 4 is a block diagram showing examples of open resource discovery API features 402. The open resource discovery API features 402 can allow users (or other API consumers) to search for, select, and implement APIs that are available from API providers. For example, the open resource discovery API features 402 can implement the developer and UI functions. A search feature 404, for example, can allow users to search for API packages, APIs, and events, such as by name or type. A discover feature 406, for example, can allow a user to list and filter packages, APIs, and events (e.g., cloud events) in various ways. An explore feature 408, for example, can allow a user to find API definitions (e.g., Open API Standard (OAS), Entity Data Model Designer (EDMD) for edmx files, Web Services Description Language (WSDL), API testing and example data sets, and event definitions (e.g., AsyncAPI). The explore feature 408 can make use of information from packages that group APIs by various features. The explore feature 408 can allow users to search for APIs using keywords, filter results, and drill down to specific information for a given API. A consume feature 410, for example, can allow a user to fetch sandbox keys, list available subscriptions and terms of use, and create new subscriptions.

Figure 5:
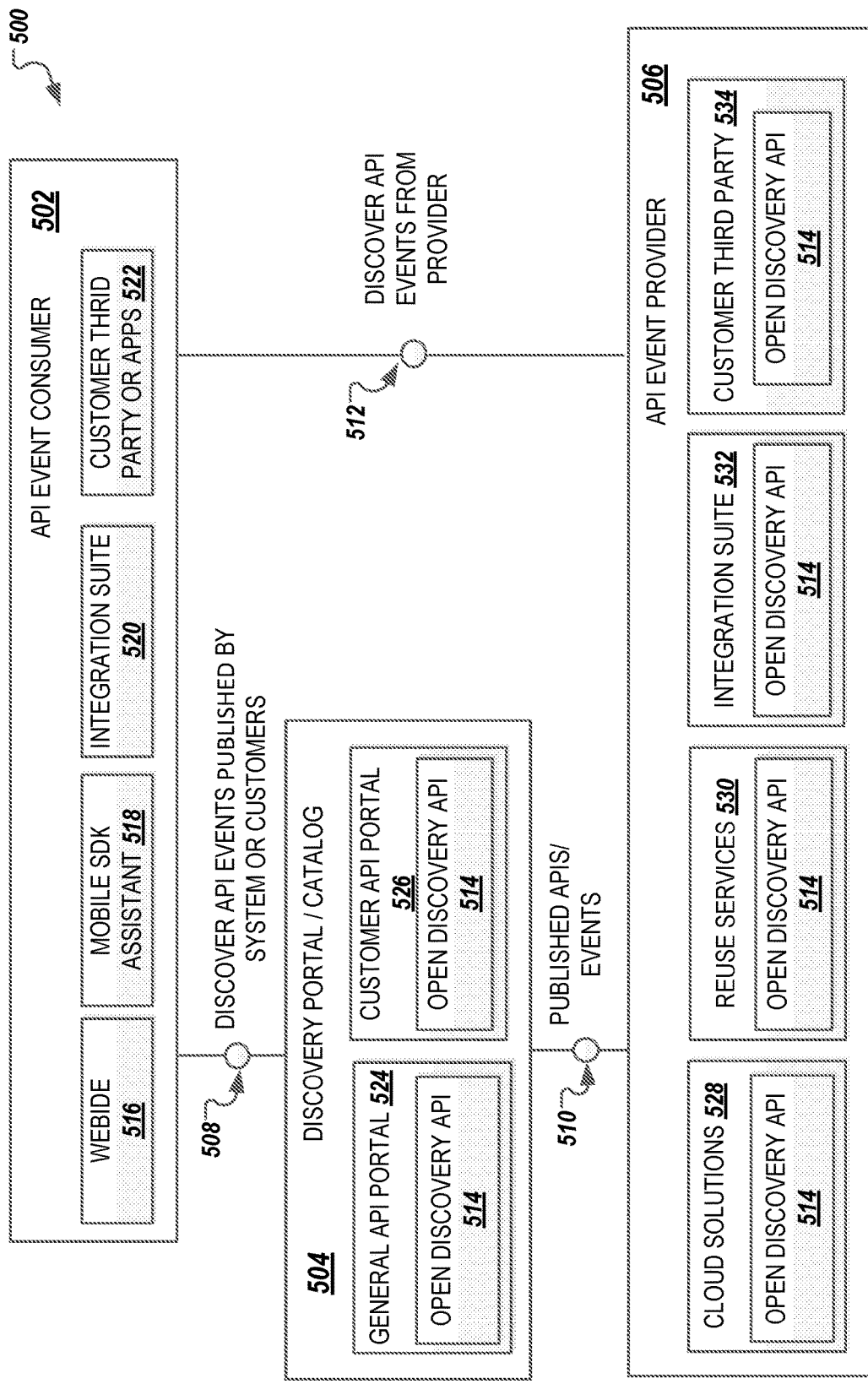
FIG. 5 is a block diagram showing an example of an architecture for open resource discovery API use.

FIG. 5 is a block diagram showing an example of an architecture 500 for open resource discovery API use. The architecture 500 can support API discovery for dependency integration and use in the cloud, for example, or in non-cloud networks. The architecture 500 can provide an open discoverable format used by API consumers to discover and use different kinds of APIs for dependency integration. Discovery can occur using the open discoverable format (for example, through a central repository), and subsequent use of the APIs can occur using the formats and communication protocols that are provided by the architecture 500. For example, the APIs of the different API providers can be exposed (for example, in a UI) in a common format that is easily digested by the user. Selection of an API can cause an automatic import of the API-specific or API-proprietary format into the user's current context. For example, importing the API-specific or API-proprietary format can cause an addition to the user's application code, where the addition is a call to the API with the corresponding input and output parameters coded in the API-specific or API-proprietary format. Further, the security mechanisms that are needed to connect to the API can automatically be completed in the user's code. Security mechanisms can include, for example, API meta information such as security definitions and external links. In the way, the open API format aspects of the architecture 500 can initially serve as a bridge for the user, after which connections occur directly to the APIs of the API providers. After an initial handshake is accomplished using the connections, for example, the open API format can be skipped.

The architecture 500 includes API/event consumers 502 that can use a discovery portal/catalog 504 for access to API/event providers 506. Discovery 508 by the API/event consumers 502 that uses the discovery portal/catalog 504 can include, for example, discovery of APIs and events 510 published by system or by customers. The discovery also relies on published APIs and events published by the API/event providers 506. After discovery, API/event consumers 502 can access the API/event providers 506 directly. Discovery by the API/event consumers 502 can also include direct discovery 512 using APIs and events published by the API/event providers 506. Components of the API/event consumers 502, the discovery portal/catalog 504, and the API/event providers 506 include open resource discovery API 514 components that provide the open API capabilities.

The API/event consumers 502 can include, for example, WebIDE tools 516, mobile SDK assistant tools 518, integration suite tools 520, customer third-party tools or applications 522. The discovery portal/catalog 504 can include, for example, a general centralized API protocol 524 and customer API protocol 526. The API/event providers 506 can include, for example, cloud solutions, 528, re-use services 530, integration suites 532, and customer/third-party APIs and events 534.

Packages can be used to group APIs by tag, for example, by API type. Tags can include, for example, product, line of production, industry, and country.

Figure 6:
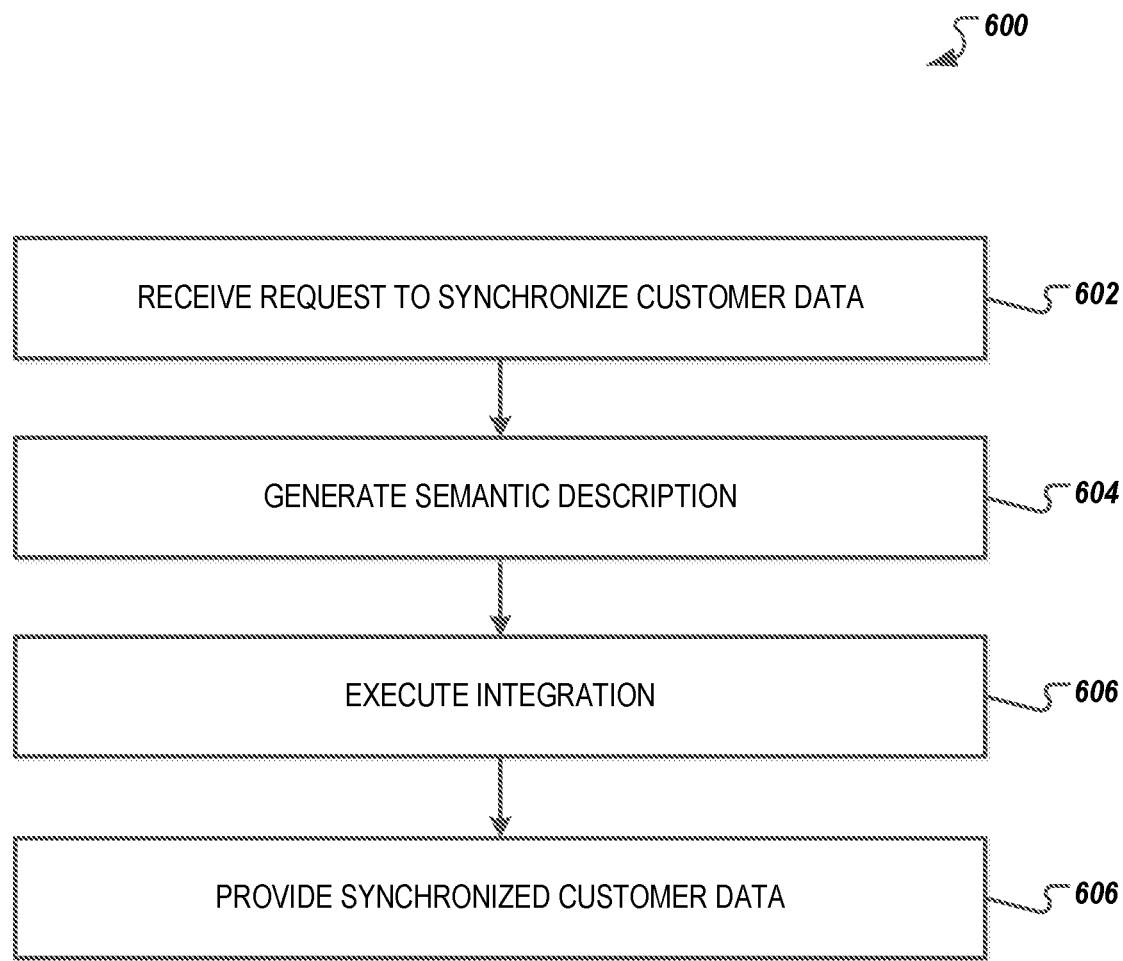
FIG. 6 is a flowchart of an example process, according to some implementations of the present disclosure.

FIG. 6 is a flowchart of an example process 600 for providing API integration dependencies. Example process 600 can be performed by any component of the example system 100, described with reference to FIG. 1. For clarity of presentation, the description that follows generally describes example process 600 in the context of FIGS. 1-5.

At 602, a request to synchronize customer data from a plurality of system instances is received. One or more system instances includes one or more application programming interfaces (API). In some implementations, the request is received in response to determining that integrations are scheduled to be setup or activated at runtime (depending on the actual state of the customer landscape). For example, the request for synchronized customer data can be initiated by a (server and/or landscape) system determining a receipt of an order to create/activate the integration of subscriptions for events (that can be available through an event broker intermediary). In some implementations, the request is received in response to determining that an integration target can be of different system types and can be selected to support an API contract. A data product can have integrations to multiple systems of the same type and, additionally, can integrate a different type of integration target system that complies to a particular API contract via an adapter. In ORD the contract can be defined as a constraint (capability). In some implementations, the request can define a data product input and an output port concept.

At 604, an ORD document including a semantic description of an integration process configured to synchronize the customer data from the system instances is generated. The semantic description defines an overall goal of the integration. For example, the semantic description defines requirements and integration dependencies between the system instances including a first system instance and a second (target) system instance. The requirements include core (single) requirement and optional requirements integrated using an AND condition, to match the statement further below on the OR condition. The optional requirements express semantically different data requested to be provided. A difference between optional requirements and API alternatives within a core (mandatory) requirement is that a single requirement provides a grouping of semantically equivalent alternatives. The semantic description can provide references (reference-based links) for aspects of a first system instance to API and/or event resources of a second (target) system instance, as described with reference to FIG. 2. Each of the aspects can include references to semantically equivalent API or event resources that are alternatives to each other, such that they are integrated using an OR condition. The system instances can include dependencies expressing semantically different data inputs. In some implementations, the request is processed to identify suitable integration targets including one or more system instances compliant with the integration process. The request can be processed to filter a system landscape to identify suitable integration targets based on integration requirements.

At 606, the integration process is executed to synchronize the customer data from multiple system instances to generate synchronized customer data. Execution of the integration process includes calling the APIs and events according to integration dependencies defined between multiple system instances. Supporting multiple providers and alternative requirements is executed for system instances configured to consume data through different channels. The deployment integration execution can include setting up a communication channel between system instances. A channel can be used for multiple APIs requests and integration capabilities. Setting up communication channels can include creation of system instance mappings. The ORD level information is included in the ORD document defining the contract and requirement level of an integration. The communication channels can be setup using the ORD document that defines relationships between ORD resources, including APIs and events. The execution of the integration process can include an automatic setup (e.g., via an operator of a centralized tool, such as an integration management environment) of the communication channels. The ORD information may be considered an additional constraint for landscape setup, but they would be best understood and realized by a landscape management tool.

At 608, synchronized customer data is provided for storage. The synchronized customer data includes code defining calls to user-selected API and event information, wherein the code is in a format of the target system (e.g., the API/event provider). The API and event information for each API provider can be accessible in a format specific to the API provider. For example, the API consumer can receive API and event information from an API provider. In some implementations, receiving the API and event information from an API provider can include receiving the API and event information directly from the API provider. In some implementations, receiving the API and event information from an API provider comprises mechanically discovering the API and event information at a source associated with the API provider. An open API format version of the API and event information can be stored, for example, in an open API format that provides a common ontology for expressing information about APIs and events available from the plural API providers. In some implementations, the open API format version of the API and event information can be published. For example, the open API system can publish information available to end user client devices.

In some implementations, the example process 600 further includes steps for providing a catalog of the APIs to a user. For example, an open API format catalog can be provided for presentation to a user, such as in a user interface. Commands to search, discover, explore, and consume the open API format version of the API and event information can be receiving, from the user. The open API format version of the API and event information can be provided responsive to the commands. In some implementations, example process 600 further includes automatically incorporating, into computer code controlled by the user, code implementing a call to user-selected API and event information, wherein the incorporated code is in the format specific to the API provider. For example, the system can automatically embed API calls in source code being developed by and under the control of the user. In some implementations, example process 600 further includes representing, using packages, the open API format version of the API and event information. For example, the user can view open API information in package form. In some implementations, example process 600 further includes representing information associated with aggregate ratings, provider, tags, and actions as components accessible to the packages.

Figure 7:
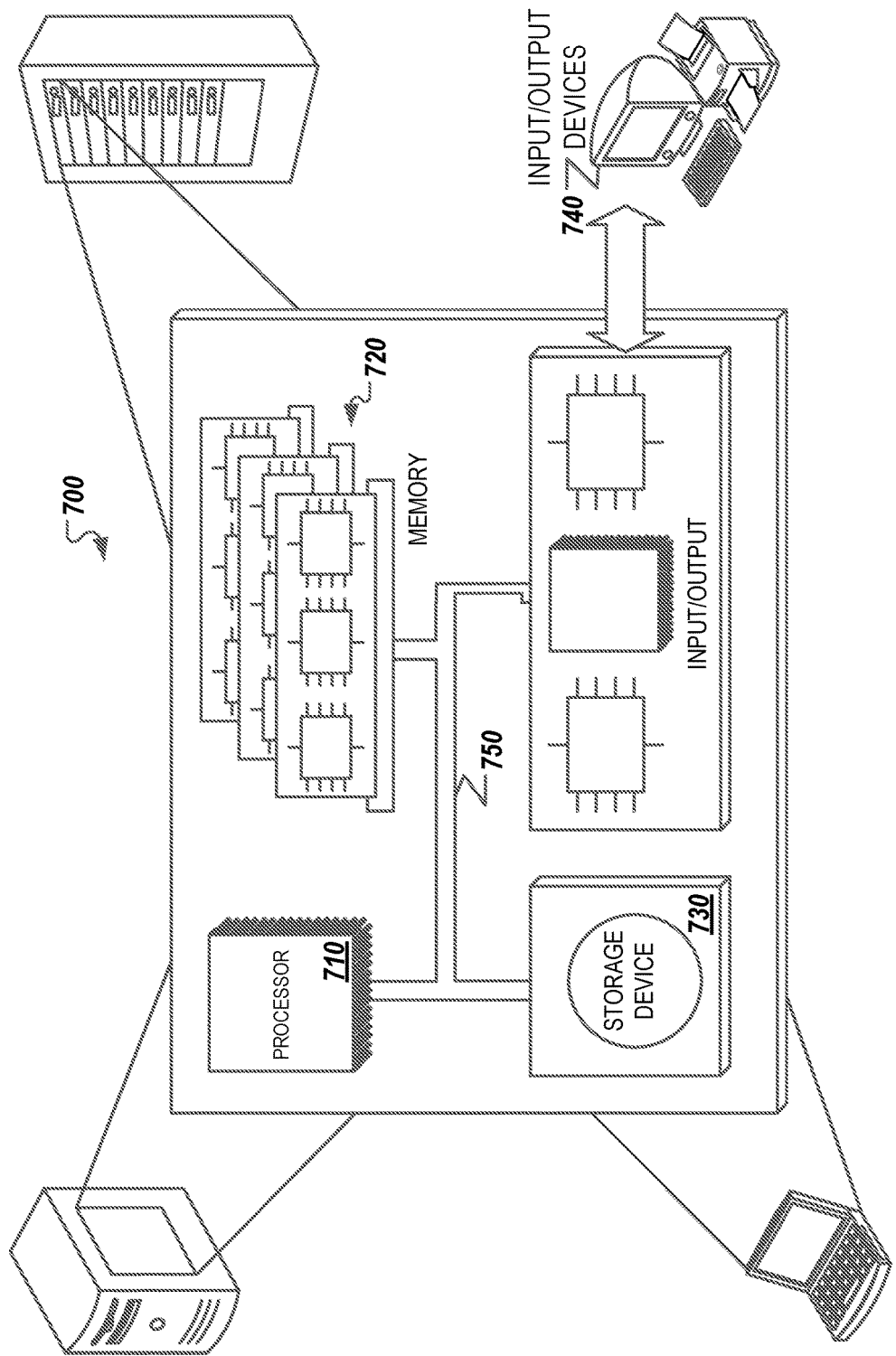
FIG. 7 is a block diagram of an exemplary computer system used to provide computational functionalities associated with described algorithms, methods, functions, processes, flows, and procedures as described in the instant disclosure.

FIG. 7 depicts a block diagram illustrating a computing system 700, in accordance with some example embodiments. Referring to FIG. 1, the computing system 700 can be used to implement the data integration system 106, any other components of the example system 100, described with reference to FIG. 1, and/or other components described with reference to FIGS. 2-5.

As shown in FIG. 7, the computing system 700 can include a processor 710, a memory 720, a storage device 730, and input/output devices 740. The processor 710, the memory 720, the storage device 730, and the input/output devices 740 can be interconnected using a system bus 750. The processor 710 is capable of processing instructions for execution within the computing system 700, such as the example process 600 described with reference to FIG. 6. Such executed instructions can implement one or more components of, for example, the data integration system 106, described with reference to FIG. 1. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided using the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects), computing functionalities, or communications functionalities. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided using the input/output device 740. The user interface can be generated and presented to a user by the computing system 700 (e.g., on a computer screen monitor).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although the disclosure has been described in terms of certain implementations and generally associated methods, alterations and permutations of these implementations, and methods will be apparent to those skilled in the art. Accordingly, the above description of example implementations does not define or constrain the disclosure. Other changes, substitutions, and alterations are also possible without departing from the spirit and scope of the disclosure.

A number of implementations of the present disclosure have been described. Nevertheless, it will be understood that various modifications may be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: receiving, by one or more processors, a request to synchronize customer data from a plurality of system instances, one or more of the plurality of system instances comprising one or more application programming interfaces (API); generating, by the one or more processors, a semantic description of an integration process configured to synchronize the customer data from the plurality of system instances, the semantic description defining integration dependencies between the plurality of system instances; executing, by the one or more processors, the integration process to synchronize the customer data from the plurality of system instances to generate synchronized customer data; and providing, by the one or more processors, the synchronized customer data.

Example 2. The computer-implemented method of example 1, wherein executing, by the one or more processors, the integration process comprises execution of the APIs and events according to integration dependencies between the plurality of system instances.

Example 3. The computer-implemented method of any of the preceding examples, wherein the semantic description comprises references to one or more system instances described as integration targets.

Example 4. The computer-implemented method of any of the preceding examples, wherein one or more of the plurality of system instances comprises dependencies expressing semantically different data inputs.

Example 5. The computer-implemented method of any of the preceding examples, further comprising: filtering, by the one or more processors, a system landscape for suitable integration targets based on integration requirements.

Example 6. The computer-implemented method of any of the preceding examples, further comprising: identifying, by the one or more processors, from the suitable integration targets, one or more system instances compliant with the integration process.

Example 7. The computer-implemented method of any of the preceding examples, wherein the suitable integration targets comprise external files.

Example 8. The computer-implemented method of any of the preceding examples, wherein the synchronized customer data comprises code defining calls to user-selected API and event information, wherein the code is in a format of an API provider.

Example 9. A computer-implemented system comprising: memory storing application programming interface (API) information; and a server performing operations comprising: receiving a request to synchronize customer data from a plurality of system instances, one or more of the plurality of system instances comprising one or more application programming interfaces (API); generating a semantic description of an integration process configured to synchronize the customer data from the plurality of system instances, the semantic description defining integration dependencies between the plurality of system instances; executing the integration process to synchronize the customer data from the plurality of system instances to generate synchronized customer data; and providing the synchronized customer data.

Example 10. The computer-implemented system of example 9, wherein executing the integration process comprises execution of the APIs and events according to integration dependencies between the plurality of system instances.

Example 11. The computer-implemented system of any of the preceding examples, wherein the semantic description comprises references to one or more system instances described as integration targets.

Example 12. The computer-implemented system of any of the preceding examples, wherein one or more of the plurality of system instances comprises dependencies expressing semantically different data inputs.

Example 13. The computer-implemented system of any of the preceding examples, further comprising: filtering a system landscape for suitable integration targets based on integration requirements.

Example 14. The computer-implemented system of any of the preceding examples, further comprising: identifying from the suitable integration targets, one or more system instances compliant with the integration process.

Example 15. The computer-implemented system of any of the preceding examples, wherein the suitable integration targets comprise external files.

Example 16. The computer-implemented system of any of the preceding examples, wherein the synchronized customer data comprises code defining calls to user-selected API and event information, wherein the code is in a format of an API provider.

Example 17. A non-transitory computer-readable media encoded with a computer program, the computer program comprising instructions that when executed by one or more computers cause the one or more computers to perform operations comprising: receiving a request to synchronize customer data from a plurality of system instances, one or more of the plurality of system instances comprising one or more application programming interfaces (API); generating a semantic description of an integration process configured to synchronize the customer data from the plurality of system instances, the semantic description defining integration dependencies between the plurality of system instances; executing the integration process to synchronize the customer data from the plurality of system instances to generate synchronized customer data; and providing the synchronized customer data.

Example 18. The non-transitory computer-readable media of example 17, wherein executing the integration process comprises execution of the APIs and events according to integration dependencies between the plurality of system instances.

Example 19. The non-transitory computer-readable media of any of the preceding examples, wherein the semantic description comprises references to one or more system instances described as integration targets.

Example 20. The non-transitory computer-readable media of any of the preceding examples, wherein one or more of the plurality of system instances comprises dependencies expressing semantically different data inputs.

What is claimed is:

1. A computer-implemented method comprising:
    receiving, by one or more processors, a request to synchronize customer data from a plurality of system instances, one or more of the plurality of system instances comprising one or more application programming interfaces (API);
    generating, by the one or more processors, a semantic description of an integration process configured to synchronize the customer data from the plurality of system instances, the semantic description of the integration process defining integration dependencies between the plurality of system instances, the integration dependencies being defined by information presented in a standard format characterizing disparate APIs of the plurality of system instances, the integration dependencies indicating scenarios to which the APIs belong to, and identifying integration targets comprising compatible target resources;
    executing, by the one or more processors, the integration process to synchronize the customer data from the plurality of system instances to generate synchronized customer data; and
    providing, by the one or more processors, the synchronized customer data.

2. The computer-implemented method of claim 1, further comprising:
    filtering, by the one or more processors, a system landscape for suitable integration targets of the integration targets based on integration requirements.

3. The computer-implemented method of claim 2, further comprising:
    identifying, by the one or more processors, from the suitable integration targets, one or more system instances compliant with the integration process.

4. The computer-implemented method of claim 3, wherein the suitable integration targets comprise external files.

5. The computer-implemented method of claim 1, wherein executing, by the one or more processors, the integration process comprises execution of the APIs and events according to integration dependencies between the plurality of system instances.

6. The computer-implemented method of claim 1, wherein the semantic description of the integration process comprises references to one or more system instances described as the integration targets.

7. The computer-implemented method of claim 1, wherein one or more of the plurality of system instances comprises dependencies expressing semantically different data inputs.

8. The computer-implemented method of claim 1, wherein the synchronized customer data comprises code defining calls to user-selected API and event information, wherein the code is in a format of an API provider.

9. A computer-implemented system comprising:
    memory storing application programming interface (API) information; and
    a server performing operations comprising:
        receiving a request to synchronize customer data from a plurality of system instances, one or more of the plurality of system instances comprising one or more API;
        generating a semantic description of an integration process configured to synchronize the customer data from the plurality of system instances, the semantic description of the integration process defining integration dependencies between the plurality of system instances, the integration dependencies being defined by information presented in a standard format characterizing disparate APIs of the plurality of system instances, the integration dependencies indicating scenarios to which the APIs belong to, and identifying integration targets comprising compatible target resources;

executing the integration process to synchronize the customer data from the plurality of system instances to generate synchronized customer data; and providing the synchronized customer data.

10. The computer-implemented system of claim 9, wherein the operations further comprise:

filtering a system landscape for suitable integration targets of the integration targets based on integration requirements.

11. The computer-implemented system of claim 10, wherein the operations further comprise:

identifying from the suitable integration targets, one or more system instances compliant with the integration process.

12. The computer-implemented system of claim 11, wherein the suitable integration targets comprise external files.

13. The computer-implemented system of claim 9, wherein executing the integration process comprises execution of the APIs and events according to integration dependencies between the plurality of system instances.

14. The computer-implemented system of claim 9, wherein the semantic description of the integration process comprises references to one or more system instances described as the integration targets.

15. The computer-implemented system of claim 9, wherein one or more of the plurality of system instances comprises dependencies expressing semantically different data inputs.

16. The computer-implemented system of claim 9, wherein the synchronized customer data comprises code defining calls to user-selected API and event information, wherein the code is in a format of an API provider.

17. A non-transitory computer-readable media encoded with a computer program, the computer program comprising instructions that when executed by one or more computers cause the one or more computers to perform operations comprising:

receiving a request to synchronize customer data from a plurality of system instances, one or more of the plurality of system instances comprising one or more application programming interfaces (API);

generating a semantic description of an integration process configured to synchronize the customer data from the plurality of system instances, the semantic description of the integration process defining integration dependencies between the plurality of system instances, the integration dependencies being defined by information presented in a standard format characterizing disparate APIs of the plurality of system instances, the integration dependencies indicating scenarios to which the APIs belong to, and identifying integration targets comprising compatible target resources;

executing the integration process to synchronize the customer data from the plurality of system instances to generate synchronized customer data; and providing the synchronized customer data.

18. The non-transitory computer-readable media of claim 17, wherein executing the integration process comprises execution of the APIs and events according to integration dependencies between the plurality of system instances.

19. The non-transitory computer-readable media of claim 17, wherein the semantic description of the integration process comprises references to one or more system instances described as the integration targets.

20. The non-transitory computer-readable media of claim 17, wherein one or more of the plurality of system instances comprises dependencies expressing semantically different data inputs.

* * * * *